(12) United States Patent
Ali et al.

(10) Patent No.: US 11,241,986 B2
(45) Date of Patent: Feb. 8, 2022

(54) VEHICLE SEATING SYSTEM AND METHOD

(71) Applicant: LEAR CORPORATION, Southfield, MI (US)

(72) Inventors: Asad S. Ali, Troy, MI (US); Mark Allyn Folkert, Farmington Hills, MI (US); Todd W. Waelde, Livonia, MI (US)

(73) Assignee: Lear Corporation, Southfield, MI (US)

( * ) Notice: Subject to any disclaimer, the term of this patent is extended or adjusted under 35 U.S.C. 154(b) by 89 days.

(21) Appl. No.: 16/431,815

(22) Filed: Jun. 5, 2019

(65) Prior Publication Data
US 2020/0384901 A1  Dec. 10, 2020

(51) Int. Cl.
| | |
|---|---|
| *B60N 2/58* | (2006.01) |
| *B29C 65/48* | (2006.01) |
| *B29C 70/68* | (2006.01) |
| *B60N 2/70* | (2006.01) |
| B29K 75/00 | (2006.01) |
| B29L 31/30 | (2006.01) |

(52) U.S. Cl.
CPC ............ *B60N 2/5891* (2013.01); *B29C 65/48* (2013.01); *B29C 70/68* (2013.01); *B60N 2/5816* (2013.01); *B60N 2/5875* (2013.01); *B60N 2/7017* (2013.01); *B29K 2075/00* (2013.01); *B29K 2713/00* (2013.01); *B29L 2031/30* (2013.01)

(58) Field of Classification Search
CPC .. B60N 2/5891; B60N 2/5875; B60N 2/7017; B60N 2/5816; B60N 2/62; B60N 2/64; B29C 65/48; B29C 70/68; B29C 44/5681; B29C 33/14; B29C 70/78; B29C 66/1122; B29C 33/16; B29C 33/18; B29C 37/0025; B29C 2045/14909; B29K 2075/00; B29K 2713/00; B29K 2715/006; B29L 2031/30; B29L 2031/58; B29L 2031/771; A44B 18/0084
See application file for complete search history.

(56) References Cited

U.S. PATENT DOCUMENTS

| | | | | |
|---|---|---|---|---|
| 4,673,542 | A | * 6/1987 | Wigner | A44B 18/0076 264/275 |
| 4,693,921 | A | * 9/1987 | Billarant | A44B 18/0076 24/306 |
| 4,784,890 | A | * 11/1988 | Black | A44B 18/0076 24/306 |
| 4,798,416 | A | 1/1989 | Faust et al. | |
| 4,931,344 | A | * 6/1990 | Ogawa | A44B 18/0084 428/100 |
| 5,540,970 | A | * 7/1996 | Banfield | A44B 18/0049 24/306 |

(Continued)

*Primary Examiner* — Leith S Shafi
(74) *Attorney, Agent, or Firm* — Brooks Kushman P.C.

(57) ABSTRACT

A vehicle seating system may include a seat part having a trim material positioned over a base material. A method for producing the seating system may include configuring an attachment arrangement to have an adhesive material and a non-adhesive material bonded to the adhesive material. The method may also include molding the base material onto the non-adhesive material such that a surface of the adhesive material faces outward away from the base material. The trim material may be disposed over the base material such that a back side of the trim material is adhered to the adhesive material.

20 Claims, 3 Drawing Sheets

(56) References Cited

U.S. PATENT DOCUMENTS

| | | | |
|---|---|---|---|
| 6,129,970 A * | 10/2000 | Kenney | A44B 18/0076 |
| | | | 428/100 |
| 8,662,583 B2 | 3/2014 | Guadagno | |
| 2003/0111881 A1 | 6/2003 | Noll | |
| 2008/0090048 A1* | 4/2008 | Janzen | B29C 44/1271 |
| | | | 428/99 |
| 2010/0146745 A1* | 6/2010 | Cheng | B29C 33/16 |
| | | | 24/306 |
| 2010/0181695 A1* | 7/2010 | Murasaki | A44B 18/0073 |
| | | | 264/176.1 |
| 2011/0260508 A1* | 10/2011 | Laframboise | A47C 31/00 |
| | | | 297/180.1 |
| 2012/0286445 A1* | 11/2012 | Ohta | B29C 44/351 |
| | | | 264/46.4 |
| 2015/0061173 A1* | 3/2015 | Murata | B29C 44/143 |
| | | | 264/46.4 |
| 2015/0328808 A1* | 11/2015 | Sasaki | B29C 44/1271 |
| | | | 264/46.4 |
| 2016/0039154 A1* | 2/2016 | Mogi | B29C 33/16 |
| | | | 428/425.9 |
| 2018/0035813 A1* | 2/2018 | Fukuda | B29C 44/12 |
| 2020/0338793 A1* | 10/2020 | Ito | B29C 44/14 |

* cited by examiner

VEHICLE SEATING SYSTEM AND METHOD

TECHNICAL FIELD

The present disclosure relates to a vehicle seating system and a method for producing a vehicle seating system.

BACKGROUND

Vehicle seating systems often include a base or cushion material, such as a polyurethane foam, and a trim cover material, which may be leather, cloth, or some other material meeting the functional and aesthetic requirements of the application. Attaching the trim cover material to the base material presents a variety of challenges, particularly with seats that have a complex geometry with various contours, including concave and convex portions. Mechanical attachment devices such as hog rings may be used, but may not be effective to maintain a desired level of contact between the trim cover material and the base material, especially in areas away from the attachment devices. It would therefore be desirable to have a seating system, and method for producing such a seating system, that provides a desired level of contact between the trim cover material and a base material over a variety of contours.

SUMMARY

Embodiments described herein may include a method for producing a vehicle seating system having a seat part with a trim material disposed over a base material includes. The method may include providing an attachment arrangement including an adhesive layer disposed between a non-adhesive layer and a cover layer, and positioning the attachment arrangement within a mold with the cover layer disposed toward an outside of the mold and the non-adhesive layer disposed toward an inside of the mold. The base material may be molded in the mold around at least a portion of the attachment arrangement such that the cover layer is accessible from outside the molded base material and the non-adhesive layer is not accessible from outside the base material. After the base material is molded, the cover layer is removed from the adhesive layer, and the adhesive layer is attached to a back side of the trim material.

Embodiments described herein may include a method for producing a vehicle seating system having a seat part with a trim material disposed over a base material. The method may include configuring an attachment arrangement to include an adhesive material and a non-adhesive material bonded to the adhesive material. The method may also include molding the base material onto the non-adhesive material such that a surface of the adhesive material faces outward away from the base material, and disposing the trim material over the base material such that a back side of the trim material is adhered to the adhesive material.

Embodiments described herein may include a vehicle seating system that has a seat part including a base material covered with a trim material. The seating system may also include an attachment arrangement integral with the base material. The attachment arrangement may include an adhesive material bonded to a non-adhesive material. The trim material may include a front side and a back side, which is adhered to the adhesive material of the attachment arrangement.

Embodiments described herein may include an attachment arrangement configured as a pad molded into a foam seat cushion to facilitate attachment of a trim cover to the cushion. The pad may have a textile layer facing into the mold and an adhesive layer facing to the outside of the mold. The textile layer may be configured to allow the foam to strongly adhere to it, and the adhesive layer may be configured to allow the trim cover to strongly adhere to it. A liner covering may form a third layer positioned over the adhesive layer during the molding process. The liner may be removed to expose the adhesive prior to assembling the trim cover to the foam.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
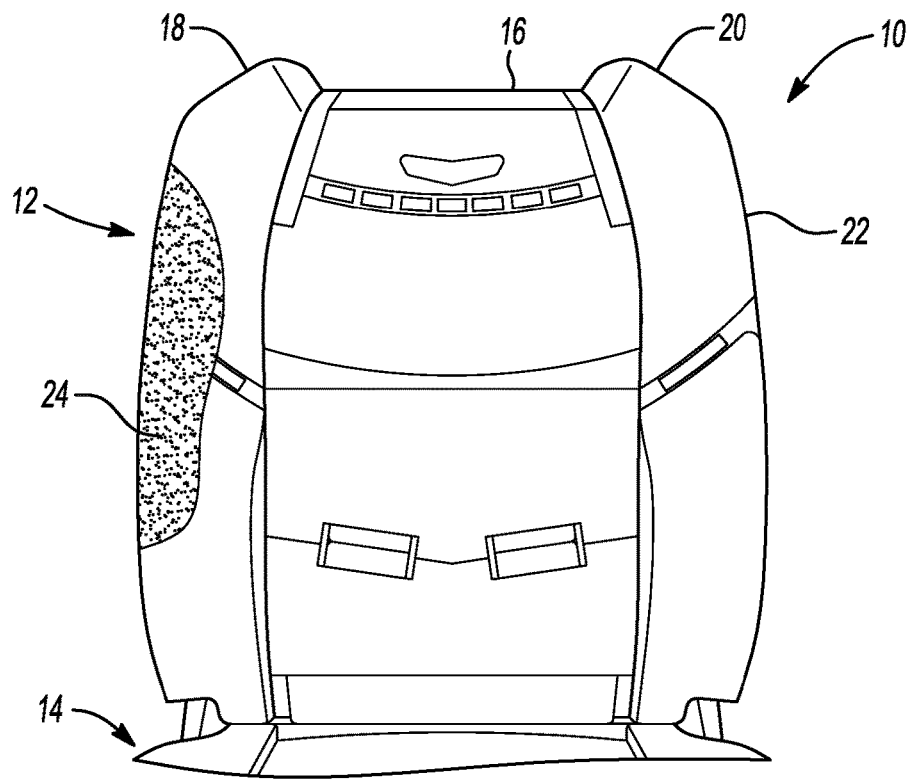
FIG. 1 shows a vehicle seating system including a seat back and a seat cushion in accordance with embodiments described herein.

FIG. 1 shows a seating system 10 in accordance with embodiments described herein. The seating system 10 includes a seat back 12 and a seat cushion 14, only a portion of which is illustrated in FIG. 1. Unless otherwise noted, the term "seat cushion" as used herein is that portion of the seat that is generally horizontal and on which the occupant sits. The seat back 12 includes a center portion 16 and two side bolsters 18, 20. In general, the seat back 12, the seat cushion 14, and the bolsters 18, 20—and bolsters for the seat cushion 14 not separately called-out in FIG. 1—may be referred to as a "seat part" for convenience. Other portions of a seating system, such as the seating system 10, may also be considered a seat part, for example, a head restraint. In FIG. 1, a base material 22 is shown, with only a portion of it being covered with a trim material 24, although it is understood that in a finished seat, a trim material, such as the trim material 24, will cover most or all of the visible surfaces of the base material 24. The base material 22 may be, for example, a polyurethane foam or other material, and the trim material 24 may be leather, cloth, vinyl, etc.

Figure 2:
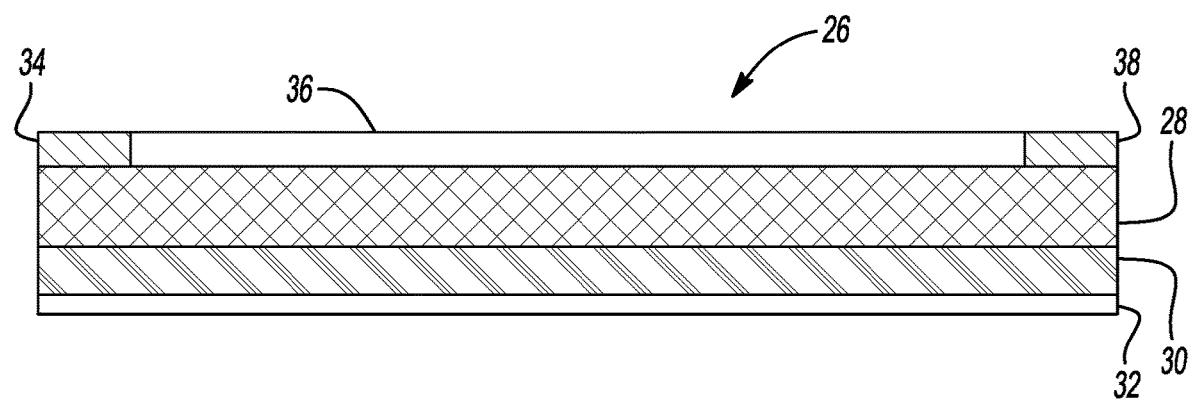
FIG. 2 shows a cross-sectional view of an attachment arrangement in accordance with embodiments described herein.

Attaching a trim material to a base material in a vehicle seat can be difficult, especially in concave areas within the seat. As used herein, the terms "concave" and "convex" are not limited to surfaces that are perfectly spherical; rather, any generally indented or inwardly projecting surface may be considered "concave" and any outwardly projecting surface may be considered "convex". To facilitate attachment of the trim material to the base material, embodiments described herein may include an attachment arrangement, such as the attachment arrangement 26 shown in FIG. 2. In the embodiment shown in FIG. 2, the attachment arrangement 26 includes a number of different materials, configured in this embodiment in layers. The attachment arrangement 26 includes a non-adhesive material 28, an adhesive material 30, and a cover material 32. As noted above, in the embodiment shown in FIG. 2, these materials are configured in layers. Specifically, the adhesive layer 30 is disposed between the non-adhesive layer 28 and the cover layer 32.

Figure 3:
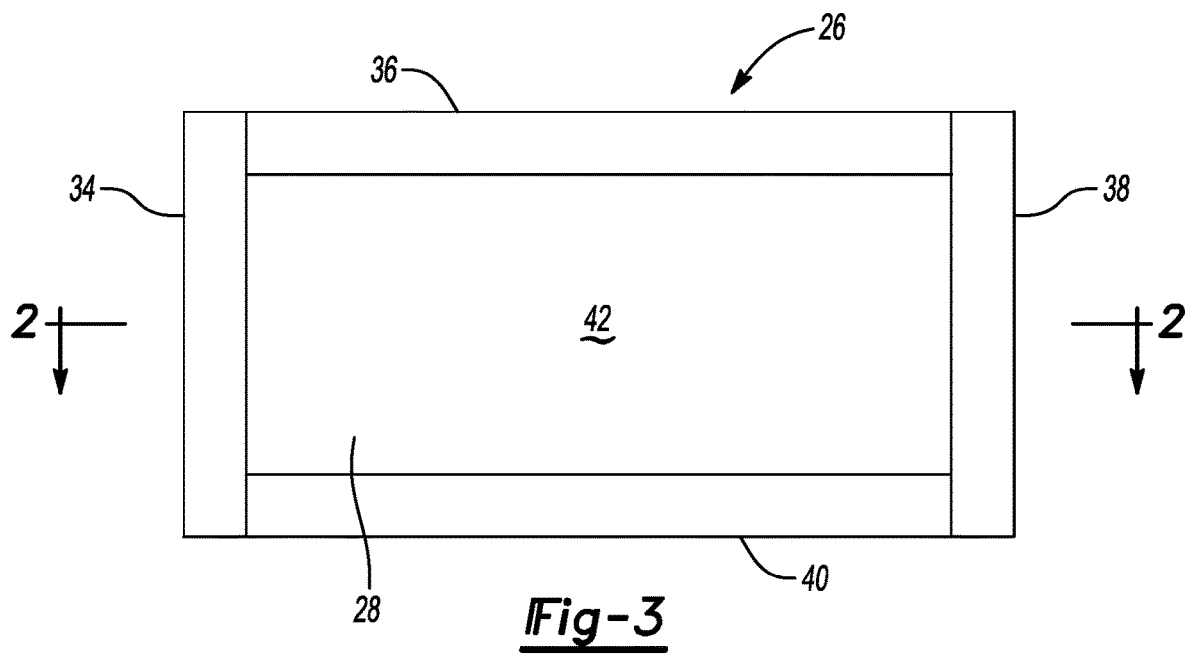
FIG. 3 shows a plan view of the attachment arrangement shown in FIG. 3.

In addition to the materials 28, 30, 32, the attachment arrangement 26 also includes a plurality of magnetically-attractive elements 34, 36, 38, 40—see also FIG. 3. The magnetically-attractive elements 34, 36, 38, 40 may be made from a metal, such as a steel alloy, that is attracted to a magnet; while in some embodiments, the magnetically-attractive elements may themselves be magnets. As explained in more detail below, magnetically-attractive elements can be used to help keep an attachment arrangement, such as the attachment arrangement 26, secure when it is placed in a mold. In the embodiment shown in FIG. 3, the magnetically-attractive elements 34, 36, 38, 40 are disposed on a surface 42 of the non-adhesive layer 28, and more particularly, are contiguously disposed around a perimeter of the non-adhesive layer 28.

Although the magnetically-attractive elements 34, 36, 38, 40 are positioned to the outside edges of the non-adhesive layer 28, magnetically-attractive elements may be disposed around a perimeter of a non-adhesive layer where the perimeter is inboard from the outside edges of the non-adhesive layer. The magnetically-attractive elements 34, 36, 38, 40 may be applied to the non-adhesive layer 28 with an adhesive, or they may be sprayed on or printed onto the surface 42. In some embodiments, magnetically-attractive elements may be applied to the attachment arrangement 26 as separate "dots" or they may be applied as strips as shown in FIG. 3. As explained in more detail below, the contiguous arrangement of the magnetically-attractive elements 34, 36, 38, 40 may provide the advantage of keeping the base material 22 from flowing under the attachment arrangement 26 during the molding process.

The layers 28, 30, 32 of attachment arrangement 26 may be made from different materials depending on the particular application. For example, in at least some embodiments, the non-adhesive layer 28 may be made from a non-woven felt material. As explained in more detail below, this type of material may adhere strongly to the base material 22 when the base material 22 is molded to it. Attachment arrangements, such as the attachment arrangement 26, may have a non-adhesive layer of 0.1-15 millimeters (mm) thick, an adhesive layer of 0.05-0.5 mm thick, and a cover layer of 0.1-0.5 mm thick, although thicknesses outside of these ranges may be desirable depending on the application. The adhesive layer 30 may be made from any adhesive material that is effective for the application. It may be advantageous, however, to use a relatively heat-resistant adhesive because of the high temperatures experienced during the molding process, which may range from 66° C. at the mold surface to 120° C. or more in the liquefied polymer used for the base material 22. In at least some embodiments, an adhesive material may have a melting point in the range of 70-150° C.

As discussed above, it may be difficult to attach a trim material to a base material in a vehicle seat, especially in concave areas of the seat or areas where the geometry is complex. An attachment arrangement, such as the attachment arrangement 26, can be used to help overcome this problem. First, the attachment arrangement 26 may be integral with the base material 22—for example, the attachment arrangement 26 may be molded to the base material 22 during an injection molding process by which the base material 22 is formed. The attachment arrangement 26 may be positioned so the base material 22 adheres to the non-adhesive layer 28 of the attachment arrangement 26. This leaves the adhesive layer 30 and the cover layer 32 facing outward, positioned to receive a back side, or B-side, of a trim material. The cover layer 32 may in some embodiments be made from a non-stick paper, similar to that which is used in peel-and-stick adhesive tapes. Thus, the cover layer 32 is removably attached to the adhesive material 30 and may be easily removed to provide a surface to which a trim material may be adhered. In at least some embodiments, and adhesive material, such as the adhesive material 30, may be a pressure-sensitive adhesive so that a trim material adheres to it immediately upon contact.

Figure 4:
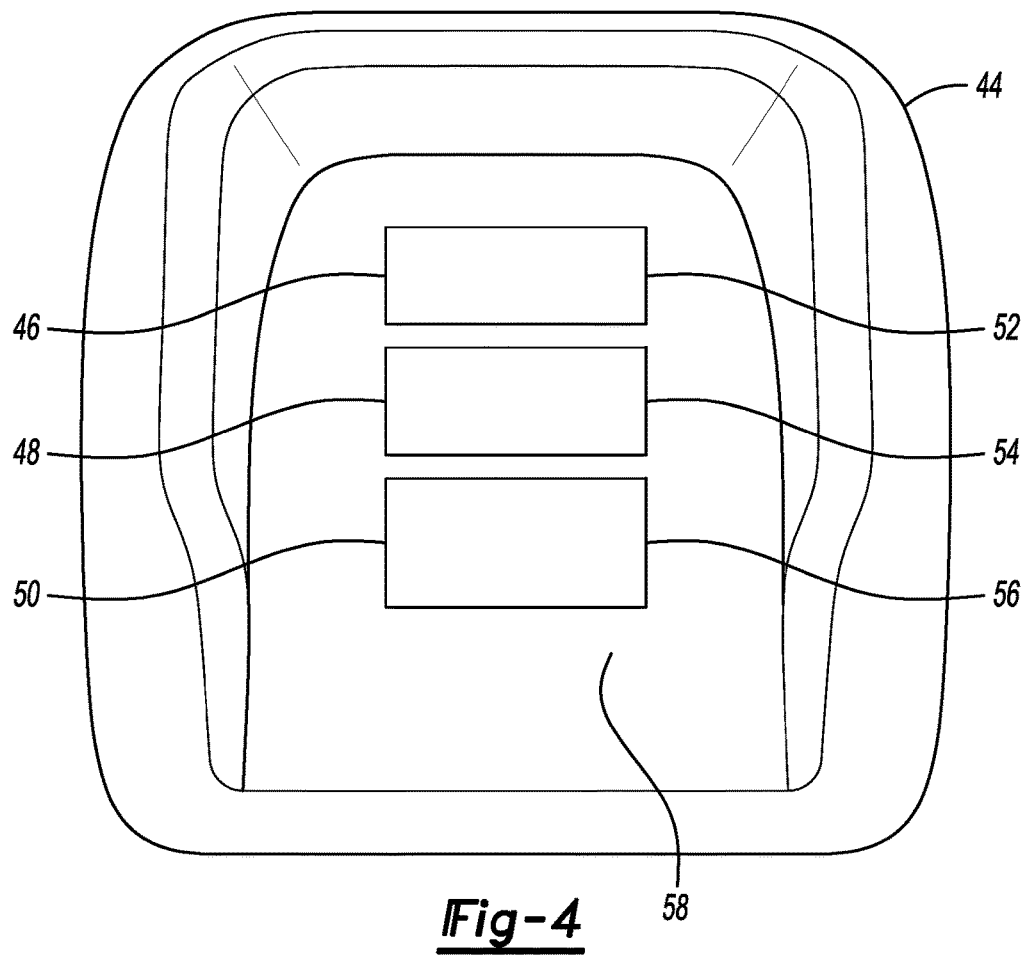
FIG. 4 shows a portion of a seat-cushion mold having three of the attachment arrangements positioned on an inside surface.

FIG. 4 shows a portion of a mold 44 used to mold a base material, such as the base material 22. Positioned within the mold 44 are three attachment arrangements 46, 48, 50. The attachment arrangements 46, 48, 50 may be generally configured as the attachment arrangement 26 shown in FIGS. 2 and 3. In the embodiment shown in FIG. 4, however, the attachment arrangements 46, 48, 50 have magnetically-attractive elements 52, 54, 56 covering an entire surface of the non-adhesive material. The attachment arrangements 46, 48, 50 are oriented with the magnetically-attractive elements 52, 54, 56—and therefore the non-adhesive layers just below them—disposed toward an inside of the mold 44. Below the non-adhesive layers are the cover layers which are disposed toward an outside of the mold 44. Therefore, the attachment arrangements 46, 48, 50 have cross sections that would appear-except for the difference in the magnetically-attractive elements—as the attachment arrangement 26 shown in FIG. 2.

In order to keep the attachment arrangements 46, 48, 50 in their desired locations during the molding process, magnets may be placed inside the mold 44. In the embodiment shown in FIG. 4, hollow areas that may be generally shaped like the attachment arrangements 46, 48, 50 may be machined out of an inside surface 58 of the mold 44. Magnets may be placed in these hollow areas using an adhesive or some other effective mechanism for keeping them in place and secured to the mold 44. Then when the attachment arrangements 46, 48, 50 are placed inside the mold 44, the magnetically-attractive elements 52, 54, 56 adhere to the magnets placed inside the mold 44, which keeps the attachment arrangements 46, 48, 50 in place during the molding process. In addition, having a contiguous surface of magnetically-attractive elements—either the contiguous perimeter of magnetically-attractive elements shown in FIG. 3 or the entire surface of magnetically-attractive elements shown in FIG. 4—helps to ensure that the base material will not flow around the attachment arrangement to the adhesive layer or the cover layer. The surface 58 of the mold 44 is generally convex as shown in FIG. 4 and projects inwardly such that the attachment arrangements 46, 48, 50 will be positioned on a generally concave surface of the base material after it is molded.

Figure 5:
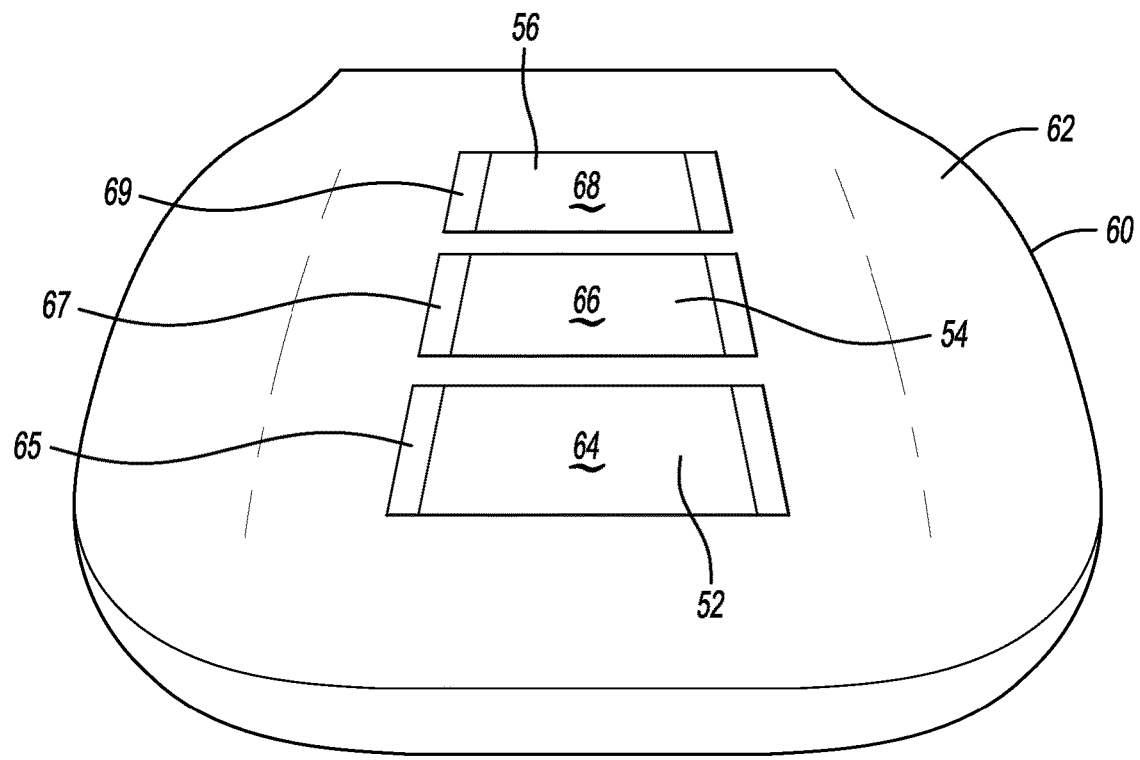
FIG. 5 shows a molded seat cushion having the three attachment arrangements integrally molded therein.

FIG. 5 shows a seat part, which in this embodiment is a seat cushion 60, made from a base material 62, which may be, for example, polyurethane. The attachment arrangements 52, 54, 56 are molded into the base material 62 in a slightly concave area and are shown with their respective cover layers 64, 66, 68 facing upward. A portion of the adhesive layers 65, 67, 69 are also shown at the edges of their respective cover layers 64, 66, 68. The cover layers 64, 66, 68 can be removed by peeling them away from the adhesive layers 65, 67, 69 underneath to facilitate attachment of a trim material over the base material 62. As described above, a base material, such as the base material 62, may be made from a polyurethane foam, but it may also be made from other materials such as expanded polypropylene, or it may be made from an injection-molded plastic.

Figure 6:
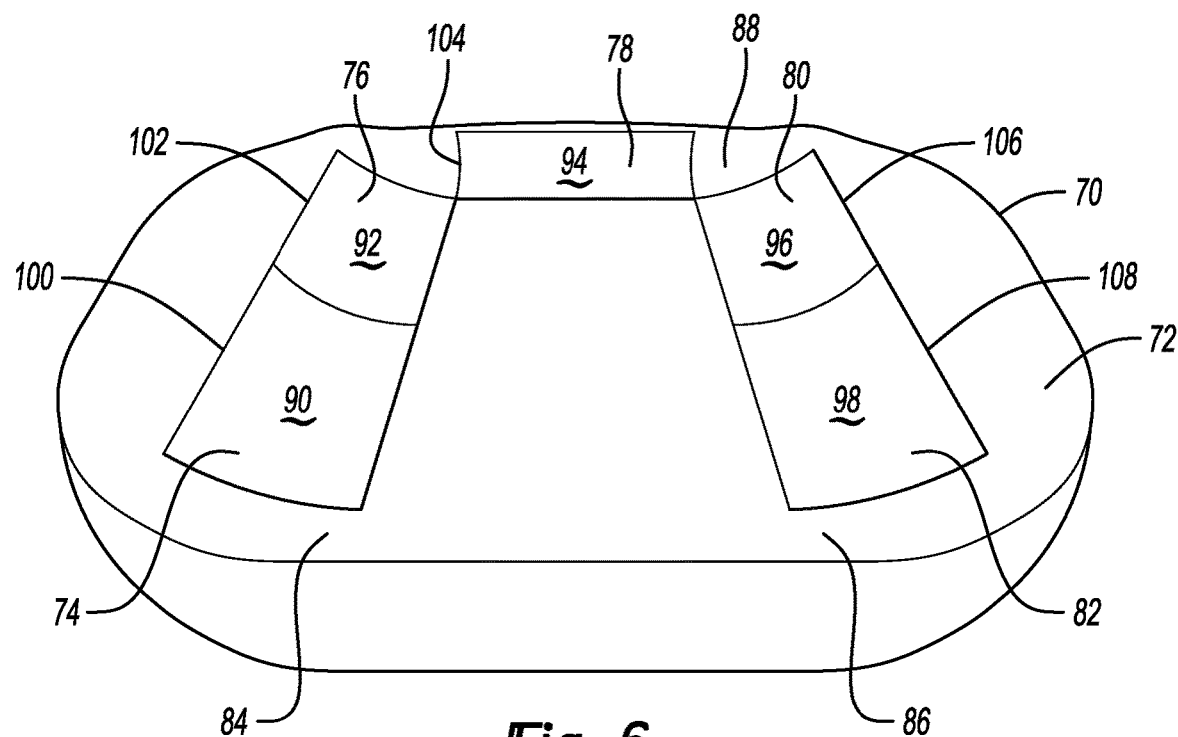
FIG. 6 shows another molded a seat cushion having several of the attachment arrangements integrally molded into concave surfaces on the cushion.

FIG. 6 shows another seat cushion 70 made from a base material 72 having five attachment arrangements 74, 76, 78, 80, 82 integrally molded therein. As shown in FIG. 6, the cushion 70 includes concave areas 84, 86 along the left and right sides, respectively and a concave area 88 along a rear of the seat cushion 70. Although attachment arrangements, such as the attachment arrangements 74, 76, 78, 80, 82, may be used on concave, flat, or even convex surfaces, their use may be particularly beneficial on base materials having a surface concavity that is up to 25 mm in depth. Similar to the configuration shown in FIG. 5, the attachment arrangements 74, 76, 78, 80, 82 are oriented with their respective cover layers 90, 92, 94, 96, 98 facing upward and covering their respective adhesive layers 100, 102, 104, 106, 108. When the cover layers 90, 92, 94, 96, 98 are removed, a trim cover material can be secured in the concave areas 84, 86, 88 by attachment to the adhesive layers 100, 102, 104, 106, 108.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for producing a vehicle seating system having a seat part with a trim material disposed over a base material, comprising:
   providing an attachment arrangement including an adhesive layer disposed between a non-adhesive layer and a cover layer;
   positioning the attachment arrangement within a mold with the cover layer disposed toward an inside surface of the mold and the non-adhesive layer disposed away from the inside surface of the mold;
   molding the base material in the mold around at least a portion of the attachment arrangement such that the cover layer is accessible from outside the molded base material and the non-adhesive layer is not accessible from outside the base material;
   removing the cover layer from the adhesive layer; and
   attaching the adhesive layer to a back side of the trim material, and
   wherein the attachment arrangement further includes at least one magnetically-attractive element disposed on a surface of the non-adhesive layer contiguously around a perimeter of the non-adhesive layer.

2. The method of claim 1, wherein positioning the attachment arrangement within a mold includes attaching the attachment arrangement to the inside surface of the mold with the at least one magnetically-attractive element.

3. The method of claim 1, wherein the non-adhesive layer includes a non-woven felt material.

4. The method of claim 1, further comprising providing a plurality of the attachment arrangements and positioning at least some of the attachment arrangements on surfaces of the mold projecting from the inside surface of the mold such that the at least some of the attachment arrangements are positioned in concave portions of the base material.

5. A method for producing a vehicle seating system having a seat part with a trim material disposed over a base material, comprising:
   configuring an attachment arrangement to include an adhesive material and a non-adhesive material bonded to the adhesive material;
   molding the base material onto the non-adhesive material such that a surface of the adhesive material faces outward away from the base material; and
   disposing the trim material over the base material such that a back side of the trim material is adhered to the adhesive material, and
   wherein the attachment arrangement is further configured to include at least one magnetically-attractive element disposed on the non-adhesive material contiguously around a perimeter of the non-adhesive material.

6. The method of claim 5, wherein the attachment arrangement is further configured to include a cover material disposed on the surface of the adhesive material when the base material is molded onto the non-adhesive material.

7. The method of claim 5, wherein molding the base material onto the non-adhesive material includes disposing the attachment arrangement in a mold and securing it to the mold with the at least one magnetically-attractive element.

8. The method of claim 6, further comprising removing the cover material after the base material is molded onto the non-adhesive material and before the trim material is disposed over the base material.

9. The method of claim 5, wherein the non-adhesive material includes a non-woven felt material.

10. The method of claim 5, further comprising configuring a plurality of the attachment arrangements and disposing at least some of the attachment arrangements on surfaces of the mold projecting from an inside surface of the mold such that the at least some of the attachment arrangements are positioned in concave portions of the base material.

11. The method of claim 1, wherein the at least one magnetically-attractive element is disposed over the entire surface of the non-adhesive layer.

12. The method of claim 5, wherein the at least one magnetically-attractive element is disposed over the entire surface of the non-adhesive material.

13. A method for producing a vehicle seating system having a seat part with a trim material disposed over a base material, comprising:
   configuring an attachment arrangement to include an adhesive material and a non-adhesive material bonded to the adhesive material;
   configuring the attachment arrangement to include at least one magnetically-attractive element disposed contiguously around a perimeter of the non-adhesive material;
   attaching the attachment arrangement to an inside surface of a mold with the at least one magnetically-attractive element; and
   molding the base material onto the non-adhesive material such that a surface of the adhesive material faces outward away from the base material.

14. The method of claim 13, wherein the non-adhesive material includes a non-woven felt material.

15. The method of claim 13, further comprising providing a plurality of the attachment arrangements and positioning at least some of the attachment arrangements on surfaces of the the mold projecting from the inside surface of the mold such that the at least some of the attachment arrangements are positioned in concave portions of the base material.

16. The method of claim 13, wherein the at least one magnetically-attractive element is disposed over the entire surface of the non-adhesive material.

17. The method of claim 13, wherein molding the base material onto the non-adhesive material includes disposing the attachment arrangement in a mold and securing it to the mold with the at least one magnetically-attractive element.

18. The method of claim 13, further comprising disposing the trim material over the base material such that a back side of the trim material is adhered to the adhesive material.

19. The method of claim 18, wherein the attachment arrangement is further configured to include a cover material disposed on the surface of the adhesive material when the base material is molded onto the non-adhesive material.

20. The method of claim 19, further comprising removing the cover material after the base material is molded onto the non-adhesive material and before the trim material is disposed over the base material.

\* \* \* \* \*